No. 723,105. PATENTED MAR. 17, 1903.
E. H. WILLIAMS.
PROCESS OF RECLAIMING FLUE DUST.
APPLICATION FILED JAN. 23, 1901.
NO MODEL.
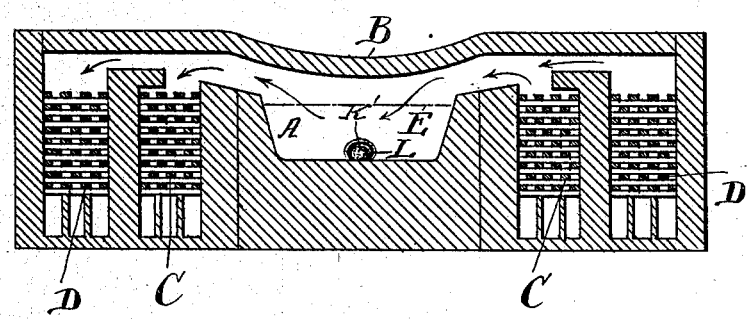
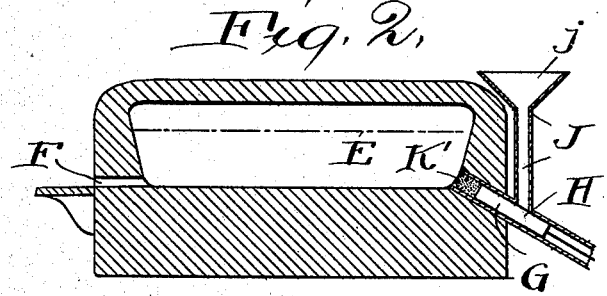
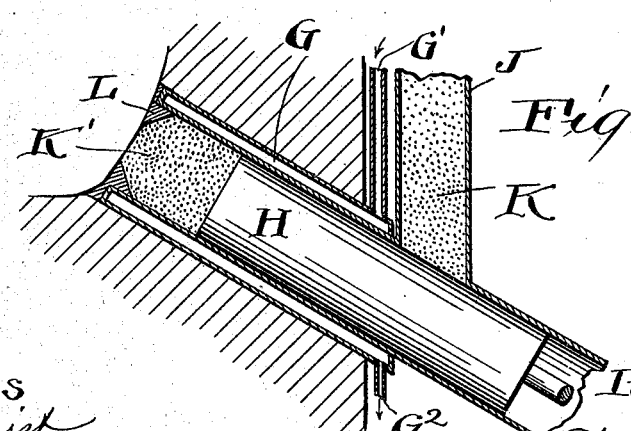
Witnesses
E. B. Gilchrist
F. D. Ammen
Inventor,
Edward H. Williams,
By his Attorneys,
Thurston & Bates

UNITED STATES PATENT OFFICE.

EDWARD H. WILLIAMS, OF SHARON, PENNSYLVANIA.

PROCESS OF RECLAIMING FLUE-DUST.

SPECIFICATION forming part of Letters Patent No. 723,105, dated March 17, 1903.

Application filed January 23, 1901. Serial No. 44,363. (No specimens.)

*To all whom it may concern:*

Be it known that I, EDWARD H. WILLIAMS, a citizen of the United States, residing at Sharon, in the county of Mercer and State of Pennsylvania, have invented a certain new and useful Improvement in Processes of Reclaiming Flue-Dust, of which the following is a full, clear, and exact description, reference being had to the accompanying drawings.

In utilizing in a blast-furnace certain iron ores, notably those from the Massaba range, a fine impalpable powder is developed, which is carried off by the draft of the waste gases. This powder, which is known as "flue-dust," it has been customary to withdraw from the gases by means of a dust-catcher or settling-chamber; but though the powder is rich in iron, being in the instance of a Massaba ore a ferric oxid, ($Fe_2O_3$,) it has not, so far as I know, been utilized, but has simply been added to the dump, for owing to its impalpable condition if it be reintroduced into the furnace it is simply blown out again by the blast.

It has been proposed to reclaim flue-dust by stirring it into molten slag either from the blast-furnace itself or from an open-hearth furnace; but such system is very difficult in operation, because as soon as the light impalpable powder strikes the molten slag it puffs up and blows away. Moreover the small quantity of it which is held by the slag is thus associated with all sorts of refuse from the furnace, as alumina, sulfur, and in the basic open-hearth process phosphorus, which it is very undesirable to reintroduce into the blast-furnace. The constituents and their quantities in this resultant slag are unknown. The different elements which it brings from the furnace vary at different times, and the amount of flue-dust which it carries also varies, so that the operator does not know what amount of the resultant slag to use in charging the blast-furnace. It has also been proposed to briquet flue-dust by compressing it cold with lime or other ingredients; but in order to make the briquets hold together they have required such pressure as to make them unduly expensive to produce, and they have necessarily been in such small units that they are also expensive to handle.

I have discovered that by fusing the flue-dust with a small percentage of free silica a sufficient amount of flue-dust is changed into an iron silicate to bind the remainder into a slag or cinder, which may then be conveniently utilized in the blast-furnace.

By the term "silica" I mean a material carrying a high percentage of silica, ($SiO_2$,) and by "free silica" I include sand, gravel, or other material high in silica which is not refuse. The amount of silica is preferably purposely kept low, so that the resultant slag shall be as rich in iron as possible. I have found that seven per cent. of silica added is very satisfactory. All this added amount combines with the iron to form a ferrous silicate. The amount of silica added, however, will vary with commercial conditions. For example, in a location or at a time when fuel is comparatively cheap and ore is comparatively dear the smallest proportion of silica will be added, so as to produce a slag rich in iron, and thus commanding a high price, even though it takes more fuel for the reverberatory furnace than would result if more silica were employed, and hence the product more cheaply fused. On the other hand, where the opposite conditions of an expensive fuel and a cheap ore obtain the process should be operated to use little fuel for the reverberatory furnace by making the slag more easily melted by having a larger proportion of silica, even though this produces a result less rich in iron. The process will vary between these two extremes of practice according to economic conditions, the corresponding range in the percentage of silica being from two to twenty-five per cent. I find, however, that the fusing of this flue-dust cannot be successfully carried on where there is a blast, for a large amount of the powder is blown out by the current before it can be fused. I accordingly fuse it in an open-hearth furnace, feeding the flue-dust into the molten slag beneath the surface thereof, the heat coming from the reverberatory roof preferably from natural gas or producer-gas coming through regenerative checker-work.

My invention includes, broadly, the process of rendering the flue-dust utilizable by fusing it with silica of sufficient quantity to bind the flue-dust into a slag, and more particularly by carrying on this process by supplying the flue-dust and binder into the molten bath thereof when the heat is maintained on the surface of the bath, as is hereinafter more fully explained.

The drawings are somewhat in the nature of diagrams, but are deemed sufficient to illustrate the present process.

Figure 1 is a transverse section through a regenerative reverberatory furnace. Fig. 2 is a longitudinal section thereof, and Fig. 3 is an enlarged vertical sectional view of the feeding apparatus.

Referring to the parts by letters, A represents the bed of the furnace, B the reverberatory roof, and C and D the regenerative checker-work through which the air and gas pass to the bed and the products of combustion from the bed, the direction of exit and entrance being alternated, as is well understood.

The dotted line E represents the surface of the molten material within the furnace. F is a suitable tap-hole for removing it. Extending outward from the lower end of the bed at a convenient point, which may be at the other end of the furnace, is the entrance-passage G, which is shown as a tubular casing adapted to be cooled by water entering and leaving through pipes G' and G². Within this tubular casing G is a reciprocating plunger H, and joining the casing is a vertical entrance-pipe J, which is shown as terminating in a hopper j. The flue-dust K, with the proper amount of silica, being placed in this hopper, as the plunger draws backward or downward in its movement the material in the vertical pipe drops downward in front of it and the plunger feeds it forward into the furnace.

The opening at the entrance to the furnace is preferably choked, as at L, to reduce its size, and the molten material at such entrance is cooled by the material K' being fed into the furnace, (and kept cool by the water-jacket G,) so that the material across the mouth is sufficiently solidified to prevent the molten bath within the furnace from flowing back to any great extent into the tubular casing. Any slag which does so flow backward, however, becomes mixed with the uncharged material and is reintroduced into the furnace when the plunger is again moved forward.

In starting the furnace the silica and flue-dust are mixed cold and admitted through an upper charging-door, (not shown,) and after this bath has become molten from the burning gas and air coming in through the checker-work the undercharging apparatus is brought into action, feeding the flue-dust and silica, as previously explained. From time to time the material is removed from the tap-hole F.

It is to be understood that the furnace above described is simply illustrative of any furnace which might be used wherein the material is fed beneath the surface of the molten slag and without a blast through the material being fused.

I claim—

1. The process of recovering flue-dust of iron ore consisting in fusing it with free silica in the absence of blast.

2. The process of recovering flue-dust of iron ore consisting in feeding a mixture of it and free silica into the action of heat above it.

3. The process of recovering flue-dust of iron ore, consisting in maintaining a molten bath of iron oxid and iron silicate and feeding free silica, in its natural state, together with flue-dust into such bath.

4. The process of recovering flue-dust of iron ore which consists in maintaining a heat in a reverberatory furnace and in feeding an excess of flue-dust with silica in its natural state, into the range of such heat, thereby causing the silica to combine with some of the iron to form an iron silicate, binding the remaining iron oxid into a slag.

5. The process of recovering flue-dust of iron ore which consists in maintaining a molten bath of silicate of iron containing an excess of iron oxid and feeding free sand and flue-dust into said bath.

6. The process of reclaiming flue-dust of iron ore consisting in maintaining a molten bath of iron oxid and iron silicate, and feeding flue-dust and silica into such bath beneath the surface of said bath.

7. The process of reclaiming flue-dust of iron ore which consists in melting flue-dust and silica thereby forming a molten bath of iron oxid and iron silicate applying heat to the surface of said bath and feeding flue-dust and silica into said bath below the surface thereof thereby causing the iron oxid and silica to combine and form a slag, and removing the resultant slag as the process proceeds.

In testimony whereof I hereunto affix my signature in the presence of two witnesses.

EDWARD H. WILLIAMS.

Witnesses:
F. W. KING,
H. A. GULLIFER.